Dec. 20, 1955     E. M. FEINBERG     2,727,331
LINE ATTACHMENTS
Filed May 23, 1952
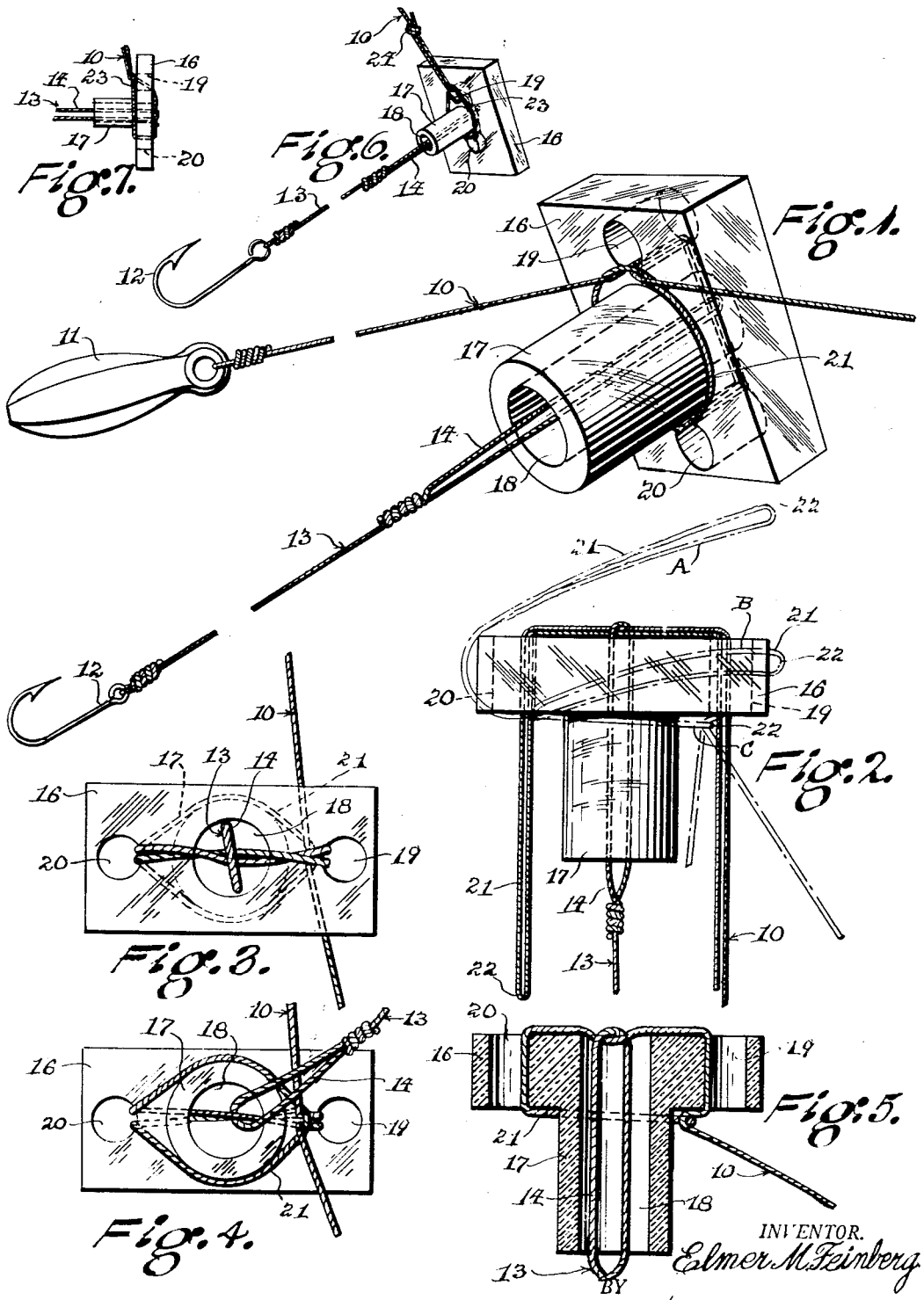

United States Patent Office 2,727,331
Patented Dec. 20, 1955

2,727,331

LINE ATTACHMENTS

Elmer M. Feinberg, Holmes, Pa.

Application May 23, 1952, Serial No. 289,585

2 Claims. (Cl. 43—44.84)

My invention relates to a new and useful line attachment particularly adapted, but not limited, to be employed as a fastener for temporarily uniting the leader of a fish hook to a fishing line, either at the terminal or intermediate the ends thereof and especially in a manner to prevent slipping.

One of the objects of the invention is to produce an exceedingly simple and relatively inexpensive line attachment whereby a member can be secured to a line without, generally, tying a knot in said line and still eliminate the possibility of slippage.

Another object of this invention is to produce a line attachment for connecting a member, such as a fish hook and leader, a secondary line or other article, to a primary line without the necessity of tying one to the other or forming a knot in said primary line.

Another object of the invention is to produce a line attachment which is used to readily and easily securely fasten a member to a line by a novel threading and looping of the line about the attachment and portions of said line, the loop thus formed also being readily and easily freed to release the fastened member and the attachment whether or not said line is wet.

A further object of this invention is to produce a line attachment consisting of a plate having a post projecting from a face thereof with a bore extending completely through said post and the plate and the latter having apertures therethrough from face to face on opposite sides of the post.

A still further object of the present invention is to provide a line attachment consisting of a plate having a centrally located post projecting from a face thereof with a bore extending through said post and the plate which latter has apertures therethrough located on opposite sides of the post, in combination with a fish hook provided with a leader having a loop received in the bore from the end distant from the plate, and a line having a loop formed therein with the bight threaded from the post side of the plate through one aperture, the snell loop and through the other aperture in a reverse direction and finally the loop opened and cast over the plate whereby said line loop will embrace the post and other portions of the line to securely fasten the fishhook leader to said line with the chances of either the line or leader slipping reduced to a minimum so that the position of the fishhook relative to the line will not change or accidentally become detached.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a view of a portion of a fishing line showing one of the attachments, on a magnified scale, in place for securing a member, such as a fishhook and its leader, to the line.

Fig. 2 is a side view of the attachment illustrating how a loop may be formed in the line and threaded through the apertures in the plate and the fishhook leader loop and showing in broken lines several positions assumed by the line loop as it is cast over the plate and brought into binding engagement with portions of said line.

Fig. 3 is an obverse face view of the attachment connected with the line for securing the fishhook or members thereto.

Fig. 4 is a reverse face view thereof with the leader of the fishhook or member pulled taut and swung to one side.

Fig. 5 is a sectional view of the same.

Fig. 6 is a perspective view of the attachment illustrating a fishhook or member secured to the terminal end of a line by means of said attachment.

Fig. 7 is a side edge view thereof.

In carrying out my invention as herein embodied I have shown, for purposes of illustration, a fishing line 10 which may have a dipsey 11, Fig. 1, secured to the terminal end thereof, and a fishhook 12 provided with a leader 13 having a loop 14 connected to the line 10 by means of the attachment 15 constituting the basis of the present invention.

The line attachment 15 consists of a plate or panel 16 of any appropriate configuration but preferably longer than it is broad or having two axes of different lengths to provide longitudinal and transverse centerlines. The plain, smooth or unobstructed face of the panel will be referred to herein as the obverse face and the opposed face is to be known as the reverse face from which the post 17 projects. Said post is preferably located at the intersection of the axes of the plate and a bore 18 runs through the post and plate, which bore is open at both ends.

Apertures 19 and 20 run through the plate 16, one on each of two opposite sides of the post 17, preferably in the longitudinal axis of said plate, said apertures along with the bore providing three openings in a row.

To secure a member, such as a fishhook and its leader, to a line intermediate the ends of the latter the loop 14 of the leader 13 is inserted into the bore 18 from the outer end of the post 17 and projected forwardly until a portion thereof protrudes beyond the obverse face of the plate 16. The line 10 is doubled upon itself at any location lengthwise thereof, Fig. 2, to produce a substantially closed loop 21 and the bight 22 threaded through the aperture 19 from the reverse face of the plate 16, then carried across the obverse face of said plate and threaded through loop 14 of the leader 13 and thence through the aperture 20 from said obverse face of the plate. Next, the line loop 21 is opened sufficiently to pass over and around the plate and is cast over the latter, as indicated by the dot and dash line positions A and B, and under the plate to the reverse face thereof so as to embrace the post 17 and the strands of the line, as indicated by the dot and dash line position C. Any strain exerted on the line causes the line loop 21 to tightly bind the embraced line strands, sometimes to such an extent that said line strands are linked as particularly illustrated in Fig. 5. The embracing of portions of the line on both sides of the line loop 21 by said loop provides a secure non-slipping connection between the line proper and the line attachment. With the connection of the attachment to the line as above described the leader of the fishhook is secured by two strands of line which bridge the inner end of the bore 18. The hook and its leader are thus suspended directly from the line without the use of a knot in said line and therefore the chance of an insecure connection which might result in slippage is eliminated.

When the line attachment is used as a terminal connection the line is folded near an end to provide a closed loop 23 which is threaded through the apertures and the leader loop and the line loop 21 subsequently cast over the plate to embrace the line strands and post for connecting the hook leader to the end of the line. If desired the loose terminal of the line may be tied to the main strand thereof, as shown at 24, Fig. 6.

It is to be particularly noted that in every instance the connection is produced by the looped portion of the line embracing other parts of the line to result in a secure binding of the elements which will absolutely prevent slipping of the connected element and the line relative to one another.

While the connection of parts is effectually secure and positive still the part joined to the line and the attachment for accomplishing the connection can be readily and easily released by merely loosening the line loop and pulling it back over the plate at which time the line may be withdrawn from the apertures leaving said line intact.

Although I have described the invention particularly with relation to a fishing line there are many other fields of endeavor where it may be employed satisfactorily. For instance, it may be used by riggers in fastening an article or articles, such as a sling or short connecting ropes, previously provided with loops, to a hoisting rope or other supporting lines.

The device can also be used for connecting cross lines to parallel main lines to support banners, ornamental strings of garlands, electric lights and the like often used for temporary decorative purposes whereby said cross lines can be expeditiously installed and removed.

When used as a fishing line attachment the article can conveniently be made from any of the well known plastics, either colored to blend with reflected or refracted light rays or colorless to allow for the passage of light rays whereby the article will be invisible in water or practically so.

Of course I do not wish to be limited to the exact details of construction herein shown and described as these may be varied within the scope of the appended claims without departing from the spirit of my invention.

Having described my invention what I claim as new and useful is:

1. In combination, a line attachment consisting of a plate having an obverse face and a reverse face and a post projecting centrally from the reverse face thereof and having a bore running completely through said post and plate open on the obverse face of said plate and at the outer end of the post, said plate having apertures therethrough from face to face on opposite sides of the post, and a line folded upon itself to provide a loop threaded through one aperture from the reverse face of the plate and threaded through the other aperture from the obverse face of said plate and cast over the plate in noose-like fashion in embracing relation to the post and a portion of said line, strands of said line comprising a portion of said loop bridging the bore opening on the obverse face of said plate whereby a member projected into the bore from the outer end of the post may be secured to the line.

2. In combination, a line attachment consisting of a plate having an obverse face and a reverse face and a post projecting centrally from the reverse face thereof and having a bore running completely through said post and plate open on the obverse face of said plate and at the outer end of the post, said plate having apertures therethrough from face to face on opposite sides of the post, a member having a loop projecting into the bore from the outer end of the post and protruding slightly beyond the obverse face of said plate, and a line folded upon itself to provide a loop threaded through one aperture from the reverse face of the plate, through the member loop and the other aperture from the obverse face of said plate and cast over the plate in noose-like fashion in embracing relation to the post and a portion of said line for securing the member to the line.

References Cited in the file of this patent

UNITED STATES PATENTS

| | | |
|---|---|---|
| 779,550 | Leffelman | Jan. 10, 1905 |
| 794,916 | Barrett | July 18, 1905 |
| 1,463,456 | Bear | July 31, 1923 |
| 1,802,260 | Kopsho | Apr. 21, 1931 |
| 2,157,477 | Bulow | May 9, 1939 |
| 2,316,074 | Kimbrough | Apr. 6, 1943 |
| 2,390,584 | Hardin | Dec. 11, 1945 |

FOREIGN PATENTS

| | | |
|---|---|---|
| 10,819 | Great Britain | 1900 |